United States Patent Office 2,925,394
Patented Feb. 16, 1960

2,925,394

PREPARATION OF ALUMINA EXTRUDATES

Harry M. Brennan, Hammond, Ind., and Edmund Field, Chicago, Ill., assignors to Standard Oil Company, Chicago, Ill., a corporation of Indiana No Drawing. Application January 18, 1957
Serial No. 634,830

5 Claims. (Cl. 252—466)

This invention relates to alumina and more particularly to a method of preparing alumina extrudates and alumina-supported catalytic extrudates.

High-purity aluminum oxide, i.e., alumina, possesses catalytic properties which make it useful in many catalytic reactions. In particular, alumina has been found to be a useful support for other catalytic materials, e.g., platinum, molybdena, etc. in the conversion of hydrocarbons, and in particular, the hydroforming of petroleum naphthas. Such alumina or alumina-supported catalysts are advantageously used in the form of cylindrical pills, e.g., ⅛" length by ⅛" diameter. One method of producing such pills is to mix a lubricant, e.g., a hydrogenated coconut oil, with crushed alumina and to pellet the lubricated alumina in conventional punch and die pelleting machines. Such a technique is expensive because of the high initial cost of pelleting machines and the continuing very high cost of maintaining such machines, particularly the dies. Extrusion of alumina presents a far less costly alternative to pelleting.

Extrusion techniques of the prior art, however, are deficient in one way or another for preparation of high-purity alumina extrudates necessary for present-day catalytic conversion processes. Some techniques of the prior art, for example, require the introduction of extraneous materials as extrusion agents, e.g., salts of aluminum, chromic acid, clays, etc., which, under many circumstances, are deleterious to the catalytic properties of the finished extrudate. Other techniques of the prior art, moreover, are applicable only to alumina containing substantial combined water, e.g., alumina trihydrate, whereas high-purity alumina may be available in many cases with a minimum of combined water, i.e., an alumina which contains about 18 percent (alumina monohydrate) or less of water in combined form.

It is therefore an object of our invention to prepare high-purity alumina or high-purity alumina-supported catalytic materials in extruded form, i.e., as extrudates. It is a further object of our invention to prepare alumina extrudates without introducing extraneous substances as extrusion agents. It is still further an object of our invention to prepare alumina extrudates from alumina containing less than about 18 percent of water. These and other objects of our invention will be apparent from the following description thereof.

We have discovered a simplified technique for extruding calcined alumina which results in a finished extrudate free of undesired extraneous substances. In practicing our invention, we knead finely-divided calcined alumina with between about 0.2 to 1.1 volumes of an aqueous solution of an amine, e.g., aqueous ammonium hydroxide, per volume of said calcined alumina, said solution having a pH in the range of between about 8 to 12, for a period in excess of about 1 minute; we then extrude the kneaded alumina and thereafter dry and calcine it. Another catalytic material, e.g., platinum, molybdena, etc. may be incorporated into the alumina prior to or after extruding the alumina in accordance with the present invention, preferably after, i.e., by impregnating the extruded alumina with the desired catalytic substance before or, preferably, after drying and/or calcining. The method of the present invention is particularly applicable to the preparation of platinum-alumina extrudates, containing about 0.01 to 1 weight percent platinum, based on dry $Al_2O_3$.

An important feature of our method is its application to calcined alumina, which, for purposes of the present invention, is defined as alumina which contains no more than about one mole of combined water per mole of alumina, e.g., alumina monohydrate. The alumina should thus contain no more than about 18 percent by weight of combined water, preferably between about 1 and 18 percent, optimally between about 2 and 10 percent. Such aluminas are prepared by drying alumina gels or sols, specifically alumina hydrogels, hydrosols, ultragels, or the like. For example, alumina hydrogel is precipitated from an aluminum salt solution by addition of alkali, and is thereafter washed to remove impurities therefrom, and dried. As another example, a Heard-type alumina hydrosol, prepared as described in Reissue Patent 22,196 (October 6, 1942), is gelled and dried. As another example, solid hydrous alumina is precipitated from an alumina hydrosol or other form of peptized alumina by aging at a pH of between about 8.5 to 12, the hydrous alumina then being separated and dried. As a further alternative, an aluminum alkoxide is hydrolyzed and the resulting alumina gel is separated and dried. Various other alternative techniques will be apparent to those skilled in the art. In all cases, the product alumina is a solid, porous material which retains a small proportion of water within the gel lattice and exhibits considerable surface activity.

To reduce the combined-water content of the alumina to the desired level of below about 18 percent by weight, the alumina is calcined at a temperature in the range of about 700–1400° F. for a period in excess of about one half hour, preferably about 1000 to 1100° F. for about 2 to 4 hours. The alumina must also be finely divided, i.e., at least about 70% of the alumina must pass through a 20 mesh ASTM sieve, preferably at least about 90% passing through a 30 mesh ASTM sieve (ASTM Designation E11–39, Part IIIA, pp. 730–36, 1946). Any technique of the prior art, e.g., crushing, grinding, etc., is suitable for preparing the alumina in finely-divided form.

Aqueous ammonium hydroxide is a highly advantageous material for use as the extrusion agent for treating the finely-divided calcined alumina in our process. Other aqueous solutions of organic amines can also be employed for this purpose, including water-soluble amines such as methylamine, dimethylamine, trimethylamine, ethylamines, isopropylamine, diisopropylamine, and furfurylamine, quaternary ammonium hydroxides such as tetramethylammonium hydroxide and benzyltrimethyl-ammonium hydroxide, and the like. In all cases, the extrusion agent must have an ionization constant sufficiently high to raise the pH to a level in the range of about 8 to 12, but insufficient to convert any considerable quantity of the alumina into aluminate salts. On this basis, a pH of around 11.5 is the practical maximum which we ordinarily choose to employ. We prefer a pH in a range of about 9.5 to 11. The extrusion agent is added to the calcined alumina before kneading, or preferably stepwise during the kneading operation. It should be added in quantity equivalent to about 0.2 to 1.1 volumes of the extrusion agent per volume of calcined alumina, preferably about 0.7 to 1.0 volume per volume.

The kneading operation is preferably carried out in any device which provides thorough mixing, contacting, and mechanical working of the ingredients, including, preferably, a shearing action. Commercial-type kneaders are described in the appropriate standard equipment catalogs. The time required for kneading is generally a function of the size and type of calcined alumina particles, the effectiveness of the particular extrusion agent, and the type of device utilized, and in all cases must be sufficient to permit a thorough incorporation of the extrusion agent in the finely divided calcined alumina. Periods in excess of about 1 minute are usually required, preferably in the range of about 5 to 30 minutes. In general, the kneaded alumina should be of a smooth, semi-moist consistency. The temperature at which kneading is carried out may range from ordinary temperatures to about 200° F., preferably in the range of about 70° F. to 100° F. Ambient pressure may be atmospheric, although it is to be anticipated that the kneading device will subject the ingredients to substantially higher mechanical pressures.

The extrusion operation is preferably carried out in commercially-available continuous extrusion machines. In one type of such machine, for example, the kneaded alumina is fed under pressure by means of a rotating screw to a cylinder having at one end an extrusion die. The die contains a series of cylindrical openings having the appropriate size and shape of the desired finished extrudate. Suitable means are usually provided in the extrusion apparatus for de-gasing or de-airing the kneaded alumina prior to the extrusion operation. Upon being forced through the die, the extruded alumina is cut by a rotating knife into cylinders of a length usually approximating the diameter, e.g., ⅛" length by ⅛" diameter. Since the kneading and extrusion devices, per se, are not part of the present invention, and since such devices are described in standard equipment catalogs, no further description is believed necessary.

After extrusion, the extruded alumina particles are dried and calcined. Drying is usually accomplished at ordinary or elevated temperatures up to about 400° F. preferably between about 150 and 400° F., for a period of about 1 to 24 hours, e.g., about 10 hours. Calcination is carried out at a temperature in the range of about 700 to 1400° F. for a period in excess of about 0.5 hour, preferably about 1000 to 1100° F. for about 2 to 4 hours. Drying and calcining may, of course, be carried out as one continuous operation wherein temperature is raised over a period of time from ordinary temperature up to calcining temperature. Too rapid increase in temperature may bring about boiling of the volatiles in the extruded alumina, thereby causing structural defects, and must therefore be avoided.

While the present invention is applicable to the preparation of alumina extrudates for use as such, it is also advantageously used for the preparation of alumina-supported catalytic extrudates, in which another catalytic substance is added to the alumina, e.g., molybdena, platinum, etc. The other catalytic substance may be present in the alumina prior to extrusion in accordance with the present invention. Alternatively, it may be added after extrusion, i.e., before or after drying and calcining the extruded alumina, preferably after calcining, in which event the alumina may require further calcination. The other catalytic substance is preferably added by impregnation of the calcined extrudate, e.g., by impregnating calcined extrudates with a solution of a platinum compound, e.g., aqueous solution of chloroplatinic acid, equivalent to about 0.01 to 1 weight percent platinum, based on dry $Al_2O_3$.

In a preferred embodiment of our invention, Heard-type alumina hydrosol prepared as described in Reissued Patent 22,196 (October 6, 1942), is gelled and dried and further calcined at a temperature of about 1000 to 1100° F. for a period of about 2 to 4 hours. The calcined alumina is then crushed to pass a 30–50 mesh ASTM sieve and is thereafter kneaded for a period of about 10 minutes while simultaneously adding, stepwise, between about 0.7 to 1.0 volume of a concentrated solution of ammonia in water per volume of calcined alumina. The kneaded alumina is extruded into ⅛" by ⅛" extrudates, dried for a period of about 10 hours at a temperature of about 250° F. and thereafter calcined at a temperature of about 1000 to 1100° F. for a period of about 2 to 4 hours. The finished extrudates may optionally be impregnated with platinum to a level of about 0.01 to 1.0 weight percent platinum, based on dry $Al_2O_3$. The platinum may be added as an aqueous chloroplatinic acid solution into which ammonium sulfide has been incorporated in a S:Pt atomic ratio between about 1 and 10. After impregnation the impregnated extrudate is further dried and calcined in the same manner as hereinabove described.

Our invention will be more fully understood from the following specific examples, which describe preparation of both gamma and eta alumina extrudates by the method of our invention and, in addition, illustrate the criticality of the requirement that the alumina be calcined, and also the inoperativeness of other extrusion agents, e.g., water:

*Example 1*

A Heard-type hydrosol was prepared according to the following procedure. Into a reaction vessel of suitable size were successively charged 1,850 parts by weight of water and 50 parts by weight of aluminum pellets, followed by 35 parts by weight of glacial acetic acid and 0.5 part by weight of mercuric oxide. The reaction mixture was agitated at a temperature of 160–170° F. for 24 hours, at the end of which time the reaction had subsided. The reaction product was allowed to settle for 12 hours, and the hydrosol was decanted from the reaction vessel.

A portion of the above hydrosol equivalent to approximately 5 pounds of anhydrous $Al_2O_3$ was dried in a steam oven at about 200 to 300° F. for a period of about 18 hours, whereby the volatiles content was reduced to about 65 percent. A portion of the resulting dried sol cake was calcined for 3 hours at 950° F., followed by a further calcination for 6 hours at 1100° F., whereby the volatile content was reduced to about 2–5 percent. The calcined material, in which the alumina was present in the gamma form, was ground to pass 30 mesh ASTM sieve.

About 100 grams of the above 30-mesh gamma alumina were mixed with approximately 80 milliliters of 5% ammonium hydroxide solution having a pH of about 10. This mixture was worked in a laboratory kneader (Heinrich pint mixer, Carl Heinrich Company) for approximately 10 minutes. The resulting kneaded alumina was then successfully extruded in a laboratory extrusion device to form cylindrical extrudates of about 1/16" diameter and ⅛" length. The extrudates were dried for 18 hours at 220° F. and calcined about 2 hours at 1100° F. During the drying and calcining operation the extrudates held their original shape.

Another experiment was carried out which illustrates the necessity of calcining the alumina prior to forming extrudates by the present invention. About 100 grams of the dried sol cake described above, which had not been calcined, were mixed with about 50 milliliters of the same 5% ammonium hydroxide solution, having a pH of about 10. Since this uncalcined alumina already contained more moisture, less of the extrusion agent was required to obtain a smooth paste than in the case of calcined alumina above. This mixture was worked in a kneader, as described above, for approximately 20 minutes. Attempts to form extrudates from this material were unsuccessful and the experiment was abandoned.

Another experiment was carried out with water as the extrusion agent. About 100 grams of the 30-mesh calcined gamma alumina prepared as described above, were mixed with about 80 grams of water. This mixture was also worked in the kneader for approximately 20 minutes. At a number of intervals during the 20-minute kneading period, attempts were made to extrude portions of the paste without success. The kneading operation was then further continued and small portions of additional water were added incrementally until the paste was about 1 part water and about 1 part alumina. After each increment of water was added, attempts were made to extrude the material without success. The experiment was therefore abandoned.

*Example II*

Another portion of the Heard-type hydrosol prepared as described in Example I, equivalent to about 1 pound of $Al_2O_3$, was mixed with concentrated ammonium hydroxide in a sufficient quantity to raise the pH of the resulting mixture to about 10.5. The mixture was allowed to age for approximately 18 hours, and during the aging solid, hydrous alumina formed as a separate phase. This alumina was separated from the liquid by filtration. The filter cake was dried for approximately 16 hours at about 220° F. A portion of this dried cake, equivalent to about 150 grams $Al_2O_3$, was calcined for about 6 hours at about 1100° F. The resulting calcined alumina contained alumina in the eta form.

About 100 grams of this calcined alumina were mixed with 80 milliliters of water and worked in a laboratory kneader for approximately 20 minutes. Attempts to form extrudates from this material in a laboratory extrusion device were unsuccessful. The material was further kneaded and during this further kneading operation concentrated ammonium hydroxide was added. This brought the liquid to a level of about 5% ammonia, corresponding to a pH of about 10. The resulting kneaded material then formed 1/16" x 1/8" cylindrical extrudates readily in the laboratory scale extrusion device. The extrudates were dried for about 16 hours at about 220° F. and calcined for about 2 hours at 1100° F. The calcined extrudates held their original shape during the drying and calcining operation.

While we have described our invention with reference to certain specific examples in the operating embodiments, it is to be understood that such embodiments are illustrative only and not by way of limitation. Numerous additional embodiments of the invention, will be apparent from the foregoing description to those skilled in the art.

In accordance with the foregoing description, we claim as our invention:

1. A method for preparing alumina extrudates of high purity which comprises kneading finely-divided calcined alumina containing between about 1 and 18 percent by weight of combined water with between about 0.2 to 1.1 volumes of aqueous ammonium hydroxide per volume of said calcined alumina, said solution having a pH in the range of between about 8 to 12, for a period in excess of about 10 seconds, extruding the kneaded alumina, and thereafter drying and calcining.

2. The method of claim 1 wherein said aqueous ammonium hydroxide is a concentrated solution of ammonia in water.

3. The method of claim 1 including the step of impregnating the extruded alumina with between about 0.01 and 1 percent by weight of platinum, based on dry $Al_2O_3$.

4. A method for preparing alumina extrudates which comprises calcining alumina at a temperature between about 700 and 1400° F. for a period in excess of about 0.5 hour, kneading the calcined alumina in finely-divided form with between about 0.2 to 1.1 volumes of aqueous ammonium hydroxide per volume of said calcined alumina, said aqueous ammonium hydroxide having a pH in the range of about 8 to 12, for a period in excess of about 1 minute, extruding the kneaded alumina, and thereafter drying and calcining.

5. A method for preparing platinum-alumina catalytic extrudes suitable for the conversion of hydrocarbons which comprises calcining alumina at a temperature between about 700 and 1400° F. for a period in excess of about 0.5 hour, kneading the calcined alumina in finely-divided form with between about 0.7 to 1.0 volume of a concentrated solution of ammonia in water per volume of said calcined alumina for a period in excess of about 1 minute, extruding the kneaded alumina, calcining the extruded alumina at a temperature in the range of about 700 to 1400° F. for a period in excess of 0.5 hour, impregnating the calcined extruded alumina with platinum by employing an impregnating solution containing a platinum compound equivalent to about 0.01 to 1.0 percent by weight of platinum, based on dry $Al_2O_3$, and drying and calcining.

References Cited in the file of this patent

UNITED STATES PATENTS

| | | |
|---|---|---|
| 2,293,099 | Barnes et al. | Aug. 18, 1942 |
| 2,326,369 | Lande | Aug. 10, 1943 |
| 2,363,876 | Lande | Nov. 28, 1944 |
| 2,475,155 | Rosenblatt | July 5, 1949 |
| 2,623,860 | Haensel | Dec. 30, 1952 |